United States Patent Office 3,003,640
Patented Oct. 10, 1961

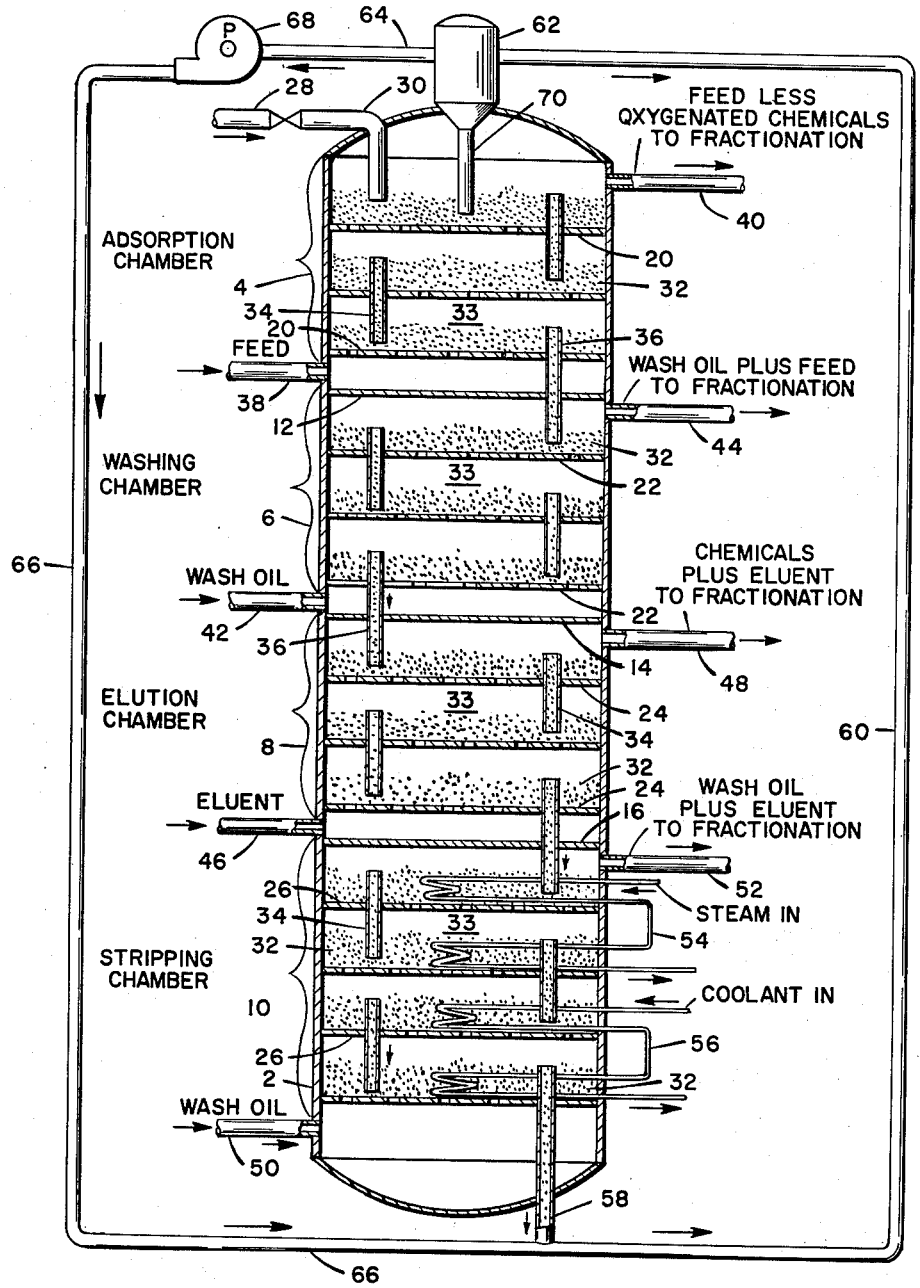

3,003,640
APPARATUS FOR SEPARATION OF MIXTURES
Frank G. Pearce, Tulsa, Okla., assignor to Pan American Petroleum Corporation, Tulsa, Okla., a corporation of Delaware
Filed Mar. 28, 1957, Ser. No. 649,091
4 Claims. (Cl. 210—189)

The present invention relates to a novel apparatus for the separation of a wide variety of liquid and gaseous mixtures. More particularly, it is concerned with a novel apparatus for use in a continuous process for effecting such separations by means of selective adsorption.

Utilization of materials for the selective adsorption of certain components of liquid or gaseous mixtures have been known and employed in various forms for a number of years. For example, many types of organic oxygenated compounds have been removed from hydrocarbon solutions by contacting the latter with a solid adsorbent such as activated alumina, silica gel or the like, after which the oxygenated compounds are recovered from the adsorbent by steam distillation or by elution with a polar solvent which is in turn followed by displacement of the eluant from the adsorbent through the use of inert gases or water vapor. The methods previously used particularly the batch processes, for the most part, however, have been relatively costly owing to the requirement of large adsorption vessels, complicated piping and timing mechanisms, and high investment in intermediate storage facilities. Likewise, continuous or semi-continuous methods involving the use of selective adsorption to separate mixtures of various types have also experienced operational difficulties. For example, in the case of methods and apparatus involving the use of a moving adsorbent bed flowing countercurrently to a liquid mixture of materials to be separated, the adsorbent tends to agglomerate and hang up in the apparatus because of the sticky or tacky characteristics of such material when wet. A further factor contributing to agglomeration of the adsorbent and subseqeunt adherence to the equipment is the presence of tacky polymeric materials in the liquid mixtures being separated. Also, in stripping or regenerating the used adsorbent for a subsequent cycle in the process the transfer of heat in the fixed or relatively compact beds thereof is notoriously poor thus resulting in a regeneration step of rather low efficiency.

One of the principal difficulties with prior methods and apparatus for effecting separation of mixtures by selective adsorption, particularly where continuous procedures have been involved, is the fact that the major component being purified is generally contaminated by the material used to wash the adsorbent after the latter has contacted the feed mixture. Prior apparatus designs, of which I am aware, made no provision for preventing substantial contamination of the purified component with the subsequently used washing agent.

Mixtures of the type which may be suitably separated by the use of the apparatus contemplated by my invention are frequently encountered in the chemical process industries. For example, the product produced in the partial oxidation of hydrocarbons ordinarily contains a wide variety of oxygenated organic compounds together with unreacted hydrocarbons. Other mixtures frequently encountered consist primarily of olefinic or aromatic and aliphatic hydrocarbons. Another example of a liquid mixture which readily lends itself to separation by means of selective adsorption is the product obtained by the reduction of carbon monoxide with hydrogen in the presence of a suitable catalyst. Mixtures of this sort, in addition to containing both saturated and unsaturated hydrocarbons, include carboxylic acids, ketones, aldehydes and alcohols. The separation of such mixtures is an extremely difficult problem which has been explored for a number of years by many investigators. Although some of the methods developed appear to have promising commercial possibilities, none of them has met with unqualified success.

Accordingly, it is an object of my invention to provide a novel apparatus adapted for use in a continuous process for separating mixtures by means of selective adsorption. It is another object of my invention to provide an apparatus in which the particles of adsorbent can be maintained in a fluidized state during the separation step. It is a further object of my invention to provide an apparatus by which contamination of the principal component—which it is desired to purify—by washing agents, etc., is held to a minimum.

While my invention is directed primarily to a novel apparatus for effecting separation of complex mixtures by means of selective adsorption, it is believed desirable, in order to convey a clear understanding of the invention, to state briefly a preferred manner in which said selective adsorption process may be carried out in my apparatus. Thus, a hydrocarbon solution of organic oxygenated compounds is first allowed to come in contact with a bed of an adsorbent material. If desired, the bulk of the oxygenated compounds can be removed from the hydrocarbon stream prior to contacting with said adsorbent material by extraction with a suitable solvent for the oxygenated organic compounds such as, for example, an aqueous soap solution of carboxylic acid salts derived from acids having from 4 to 12 carbon atoms. The adsorbed organic oxygenated compounds can thereafter be eluted from the adsorbent by use of a more polar material which may be an organic oxygenated compound. Some eluant remains on the adsorbent and can be displaced by contacting with a light hydrocarbon wash oil at temperatures sufficient to vaporize the eluant. A stream of the eluant and hydrocarbon is then withdrawn from the adsorption zone and the eluant and hydrocarbon separated.

The hydrocarbon wash oil, when used in removing the eluant from the adsorbent, is generally employed at a temperature such that it is largely in vapor form. It should be a material easily separated from the eluant and must not injure the adsorbent if it is not completely removed. As examples of suitable materials for this purpose there may be mentioned naphtha vapor, low boiling paraffinic and naphthenic hydrocarbons, such as propane, butane, pentane, cyclopentane, the hexanes, or the like, or mixtures of such hydrocarbons.

The eluant employed is preferably a solvent for the originally adsorbed material. The adsorbent should have greater affinity for the eluant than for the material originally adsorbed so that it may replace the latter. This leaves the adsorbent saturated with eluant but substantially free of the originally adsorbed material. As examples of suitable eluants there may be mentioned such polar liquids as methanol, acetone, ethanol, the acetone-methanol azeotrope, and the like. More specifically, the eluant is preferably a material which can be completely stripped from the adsorbent with hydrocarbon vapors leaving the adsorbent in a condition satisfactory for repeated use.

A preferred embodiment of the apparatus of my invention is shown in the accompanying drawing and comprises an elongated enclosed shell 2 having fluid tight adsorption, washing, elution and stripping chambers 4, 6, 8 and 10, respectively. Each of these chambers is equipped with imperforate plate members 12, 14 and 16, fitting to the walls of shell 2 in fluid tight relationship.

Also, in each of these chambers are spaced grids or perforated plates 20, 22, 24 and 26. Adsorbent is orignally introduced into the top of the apparatus through make-up line 28, passed on into adsorption chamber 4 via conduit 30 secured by means of plate 12 extending into a first of a series of adsorbent beds 32. Within each of said chambers each of said beds is separated from the other by space 33. Flow of adsorbent material downwardly through each of the chambers in the apparatus is accomplished through the use of additional downcomers 34 and 36, the latter extending from one chamber to the next immediately below and serving as the only means by which adsorbent may flow from one chamber to another. Chamber 4 is equipped with inlet and outlet lines 38 and 40, respectively. Similar inlet and outlet lines communicate with washing chamber 6, elution chamber 8 and stripping chamber 10, such inlet and outlet lines being designated 42 and 44, 46 and 48, and 50 and 52, respectively.

In stripping chamber 10 is a steam coil 54 placed in upper adsorbent beds 32 for use in driving off eluant to regenerate the adsorbent. In the lower beds is placed a cooling coil 56 for lowering the temperature of the freshly regenerated adsorbent. A downcomer 58 extends from the bottom bed in chamber 10 through the lower end of shell 2 and communicates with transfer lines 60 and 66. Line 60 carries the adsorbent to a cyclone separator 62, or other suitable device, in the form of an oil slurry in which the oil for this purpose is derived from separator 62 via line 64 and forced through line 66 into line 60 by means of centrifugal pump 68. Adsorbent separated from the carrying fluid in this manner passes into adsorption chamber 4 for reuse by means of dip leg 70.

My invention may be further illustrated by describing the application thereof to the separation of oxygenated chemicals present in crude hydrocarbon synthesis oil. Referring to the drawing, raw hydrocarbon synthesis oil is charged through line 38 into adsorption chamber 4 at a velocity of from 0.1 to about 5 feet per minute. The adsorption step is generally effected at temperatures ranging from about 20° to 40° C. Hydrocarbon feed flowing into chamber 4 passes upwardly through grids or perforated plates 20 and through adsorbent beds 32.

Chamber 4 eventually fills with oil and an essentially chemical-free stream is withdrawn through line 40. Adsorbent containing oxygenated chemicals flows downwardly through chamber 4 via downcomers 34 and into washing chamber 6 via downcomer 36. Pentane, at a temperature of 20° to 40° C., is then introduced into washing chamber 6 through line 42, fills chamber 6 and is withdrawn through line 44. This step serves to remove any occluded hydrocarbons which may still be present on the surface of the adsorbent from the previous adsorption step. Simultaneously with the contacting of pentane, a portion of the adsorbent continuously passes downwardly through chamber 6 via downcomers 34 and flows into the adjacent eluant chamber 8 via connecting downcomer 36.

In chamber 8 washed adsorbent is contacted with methanol at a temperature of about 20° to 40° C., the methanol being introduced into chamber 8 at a flow rate of about 0.1 to 5 feet per minute. From the upper portion of chamber 8 a stream emerges through line 48 consisting principally of eluant and oxygenated chemicals displaced from the adsorbent. Adsorbent from which the chemicals have been substantially removed then flows into stripping chamber 10 through downcomer 36 where the finely divided material undergoes a regenerative treatment with hot pentane liquid or vapors at a temperature of about 100° to 200° C. From the upper portion of chamber 10 a mixture of wash oil and eluant is removed and these materials subsequently separated for further use in the process. Stripped, regenerated adsorbent, after contacting cooling coils 56, is removed from chamber 10 by means of conduit 58 and introduced into transfer line 60 together with a stream of oil flowing from line 66 into line 60. The resulting slurry of oil and adsorbent is thus carried to the top of the apparatus and introduced into a suitable cyclone separator 62 where oil free, regenerated adsorbent then flows through dip leg 70 into adsorption zone 4 for the succeeding cycle. Separated oil flows into line 64 and flows through line 66 serving as a vehicle for the continuously regenerated adsorbent entering line 60. Adsorbent is initially charged to the apparatus through line 28 and make-up adsorbent may also be introduced into the apparatus by this means.

Throughout the process the liquid streams are introduced into the apparatus at a linear velocity of from about 0.1 to about 5 feet per minute in order to maintain the adsorbent in beds 32 in a substantially fluidized state. Under these conditions adsorbent slowly travels downwardly through the apparatus via downcomers 34 and 36 at the rate of about .05 to .3 feet per second.

From the foregoing description it will be seen that when using the apparatus of my invention relatively little opportunity exists for contamination of the stream in the preceding step by the stream used in the step following. This result is possible because adsorbent particles pass from one fluid tight chamber to another only by means of downcomers 36. In these downcomers, upward flow of fluid is negligible because of the strong tendency thereof to pass through outlets 40, 44, etc.

I claim:

1. Apparatus for separating components of a mixture by selective adsorption methods comprising an enclosed elongated shell having successively and vertically disposed therein individual adsorption, washing, elution and regenerating chambers, said chambers being defined by spaced plates conforming to the walls of said shell in fluid-tight relationship, feeding means for introducing adsorbent material into said adsorption chamber, individual means in each of said chambers for the introduction and withdrawal of a fluid from said shell, a single conduit in each of said plates placing adjacent chambers in communication with one another, said plates being otherwise imperforate, the upper end of each of said single conduits opening into the upper of said adjacent chambers thereby placing said upper end above the level of said individual withdrawal means in the lower of said adjacent chambers, means in said regenerating chamber for withdrawing regenerated adsorbent therefrom, and means for externally transferring regenerated adsorbent to said feeding means.

2. Apparatus for separating components of a mixture by selective adsorption methods comprising an enclosed elongated shell having successively and vertically disposed therein individual adsorption, washing, elution and regenerating chambers, said chambers being defined by spaced plates conforming to the walls of said shell in fluid-tight relationship, feeding means for introducing adsorbent material into said adsorption chamber, spaced grids in each of said chambers defining individual compartments within said chambers, a conduit in each of said grids placing adjacent compartments in communication with one another, a single conduit in each of said plates placing adjacent chambers in communication with one another, said plates being otherwise imperforate, said conduit in each of said plates extending into the compartments adjacent either side of each of said plates placing said last-mentioned compartments in communication with one another, means in the first compartment in each of said chambers for withdrawal of a fluid from said shell, the upper end of each of said single conduits opening into the upper of said adjacent chambers thereby placing said upper end above the level of said individual withdrawal means in the lower of said adjacent chambers, means in the last compartment in each of said chambers for the introduction of a fluid, means in said regenerating chamber for withdrawing regenerated adsorbent therefrom, and means for externally transferring regenerated adsorbent to said feeding means.

3. Apparatus for separating components of a mixture by selective adsorption methods comprising an enclosed elongated shell having successively and vertically disposed therein individual adsorption, washing, elution and regenerating chambers, said chambers being defined by spaced plates conforming to the walls of said shell in fluid-tight relationship, feeding means for introducing adsorbent material into said adsorption chamber, spaced grids in each of said chambers defining individual compartments within said chambers, a conduit in each of said grids placing adjacent compartments in communication with one another, a single conduit in each of said plates placing adjacent chambers in communication with one another, said plates being otherwise imperforate, said conduit in each of said plates extending into the compartments adjacent either side of each of said plates placing said last-mentioned compartments in communication with one another, means in the first compartment in each of said chambers for withdrawal of a fluid from said shell, the upper end of each of said single conduits opening into the upper of said adjacent chambers thereby placing said upper end above the level of said individual withdrawal means in the lower of said adjacent chambers, means in the last compartment in each of said chambers for the introduction of a fluid, and means in said regenerating chamber for the external withdrawal of adsorbent.

4. Apparatus for separating components of a mixture by selective adsorption methods comprising an enclosed elongated shell having successively and vertically disposed therein individual adsorption, washing, elution and regenerating chambers, said chambers being defined by spaced plates conforming to the walls of said shell in fluid-tight relationship, feeding means for introducing adsorbent material into said adsorption chamber, spaced grids in each of said chambers defining individual compartments within said chambers, a conduit in each of said grids placing adjacent compartments in communication with one another, a single conduit in each of said plates placing adjacent chambers in communication with one another, said plates being otherwise imperforate, said conduit in each of said plates extending into the compartments adjacent either side of each of said plates placing said last-mentioned compartments in communication with one another, means in the first compartment in each of said chambers for withdrawal of a fluid from said shell, a space between the last compartment in each of said chambers defined by the grid in said last compartment and the plate adjacent thereto, the upper end of each of said single conduits opening into the upper of said adjacent chambers thereby placing said upper end above the level of said individual withdrawal means in the lower of said adjacent chambers, means communicating with said space for the introduction of a fluid therein and means in said regenerating chamber for the external withdrawal of adsorbent.

References Cited in the file of this patent

UNITED STATES PATENTS

| | | |
|---|---|---|
| 2,564,717 | Olsen | Aug. 21, 1951 |
| 2,632,720 | Perry | Mar. 24, 1953 |
| 2,671,714 | McIlhenny | Mar. 9, 1954 |
| 2,735,803 | Leffer | Feb. 21, 1956 |
| 2,801,966 | Mertes | Aug. 6, 1957 |

FOREIGN PATENTS

| | | |
|---|---|---|
| 735,635 | Germany | May 20, 1943 |